United States Patent [19]
Sudo et al.

[11] Patent Number: 5,327,539
[45] Date of Patent: Jul. 5, 1994

[54] ACCESS PROCESSING SYSTEM IN INFORMATION PROCESSOR

[75] Inventors: Kiyoshi Sudo; Yasutomo Sakurai; Koichi Odahara; Kenji Hoshi; Hideharu Kanaya, all of Kawasaki, Japan

[73] Assignee: Fujitsu Limited, Kawasaki, Japan

[21] Appl. No.: 841,477

[22] Filed: Feb. 26, 1992

[30] Foreign Application Priority Data

Feb. 26, 1991 [JP] Japan ............................. 3-030503

[51] Int. Cl.⁵ ............................................. G06F 13/38
[52] U.S. Cl. ......................... 395/325; 364/DIG. 2; 364/935.4; 364/935.49; 364/958.5
[58] Field of Search .................. 395/325, 425, 400, 725

[56] References Cited
U.S. PATENT DOCUMENTS 4,523,272 6/1985 Fukunaga et al. .................. 395/325
5,056,015 10/1991 Baldwin et al. ..................... 395/725
5,261,073 11/1993 Mann ................................... 395/425

Primary Examiner—Debra A. Chun
Attorney, Agent, or Firm—Staas & Halsey

[57] ABSTRACT

In an access processing system in an information processor, the information processor includes: an access device (10, 11) for generating an access request signal; an accessed device (13) provided with a memory means (30) that is accessed by the access device (10, 11); and an address bus (14) that has the access device and accessed device connected with the information processor at least by the address bus (14).

The access processing system is processed such that, if an access request is produced, when the access request signal does not require all bits in the address bus (14), an unused bit in the address bus (14) is loaded with write data to deliver it to the accessed device (13).

8 Claims, 11 Drawing Sheets

DATA ON ADDRESS BUS

WR1

WR2

ONLY IN CASE OF SS ACCESS USED

AR

DATA ON ADDRESS BUS

Fig. 10

EXAMPLE OF STORAGE KEY MODIFY DUE TO IMPLICIT ACCESS

| STATE OF BEFORE-ACCESS | | | READ MODE AFTER-ACCESS | | | WRITE MODE AFTER-ACCESS | | |
|---|---|---|---|---|---|---|---|---|
| OR | OC | OP | NR | NC | NP | NR | NC | NP |
| 0 | 0 | 1 | 1 | 0 | 0 | 1 | 1 | 1 |
| 0 | 1 | 0 | 1 | 1 | 1 | 1 | 1 | 1 |
| 1 | 0 | 0 | 1 | 0 | 0 | 1 | 1 | 1 |
| 1 | 1 | 1 | 1 | 1 | 1 | 1 | 1 | 1 |

Fig. 11

EXAMPLE OF ACCESS MODE

| ACCESS MODE BIT | | | |
|---|---|---|---|
| M0 | M1 | | |
| 0 | 0 | SS READ | } ACCESS MODE No. 1 |
| 0 | 1 | SS WRITE | |
| 1 | 0 | STORAGE KEY READ | } ACCESS MODE No. 2 |
| 1 | 1 | STORAGE KEY WRITE | |

ACCESS PROCESSING SYSTEM IN INFORMATION PROCESSOR

BACKGROUND OF THE INVENTION

1. Field of the Invention

The present invention relates to an access processing system in an information processor and more particularly, to an access processing system that can mitigate competition between data buses in the course of accessing a memory device.

2. Description of the Related Art

In recent years, with the increased popularity of information processing equipment such as computers, there has been a demand for a reduction in cost and increased operating speeds.

In general, such information processors are constituted such that a central processing unit (abbreviated CPU) and its peripheral equipment such as a memory device, an input/output device or the like are connected mutually by a bus. When a CPU provides an access to the peripheral, the transfer of data is realized by delivering/receiving an address, data or a command (access mode) via a bus. Therefore, a more effective utilization of the buses is desired to improve system performance.

In the prior art, when an explicit write access is carried out with regard to a storage key device, since an address must be held until a write operation of write data to a predetermined address of the storage key device has been completed, it is disadvantageous that a monitoring of the address cannot be carried out in the meantime and the delivery of the new address must be inhibited. Further, when a prior read access is created and the delivery of write data is suspended, an access of another CPU must be inhibited, and even if there is no suspension of the delivery of write data, since an access operation is inhibited for a specified time and it is necessary to have a CPU that requires access to a system storage device, the system's performance deteriorates.

SUMMARY OF THE INVENTION

In light of such circumstances, the present invention has been devised.

It is an object of the present invention to provide an access system in an information processor such that, even when an explicit write access is made to a storage key device, the delivery of write data is not suspended and deterioration of system performance can be prevented therefrom.

In accordance with a feature of the present invention, there is provided an access system in an information processor in which the information processor includes: an access device for generating an access request signal; an accessed device provided with a memory means that permits access by said access device and an address bus that has the access device and accessed device connected with the information processor, wherein the access system is processed such that, if an access request is produced, when the access request signal does not require use of all bits in the address bus, an unused bit in the address bus is loaded with write data and delivered to the accessed device.

In accordance with another feature of the present invention, there is provided an access system in an information processor in which the information processor includes: an access device for generating an access request signal; an accessed device provided with a memory means which permits access by the access device; and at least an address bus and an access mode bus which have the access device and the accessed device connected with the information processor by said address bus and access mode bus, wherein the access system is processed such that, when an access request signal is generated, if the access request signal does not necessitate the use of all the bits of the address bus, the access device loads the access mode bus with mode data and unused bits of the address bus with write data to deliver the mode data and write data to the accessed device, and wherein when it is decided that mode data received from the access device via the access mode bus does not necessitate use of all the bits of the address bus, the accessed device regards one part of the address bus as an address and the other part of the address bus as write data, to permit access to a memory means of the accessed device.

In accordance with still another feature of the present invention, there is provided an access system in an information processor in which the said information processor includes: an access device for generating an access request signal; an accessed device provided with a memory means that permits an access by said access device; and at least an address bus and an access mode bus to which the access device and the accessed device are connected, wherein the access device includes first control means such that, when an access request signal is generated, if the access request signal does not necessitate all the bits of an address bus, the access device has mode data with the access mode bus and write data with unused bits of the address bus, to deliver the mode data and write data to the accessed device, and wherein the accessed device includes a second control means such that, when it is determined when mode data received from, the access device via the access mode bus does not necessitate the use of all the bits of the address bus, the accessed device regards one part of the address bus as an address and the other part of the address bus as write data, to permit access to a memory means of the accessed device.

BRIEF DESCRIPTION OF THE DRAWINGS

FIG. 10 is a view showing an example of a modification in a storage key due to implicit access;

FIG. 11 is a view showing an example of an access mode No. 1 and No. 2.

PREFERRED EMBODIMENTS OF THE INVENTION

With reference to the previously utilized techniques, an embodiment of the present invention will be described hereinafter.

Figure 1:
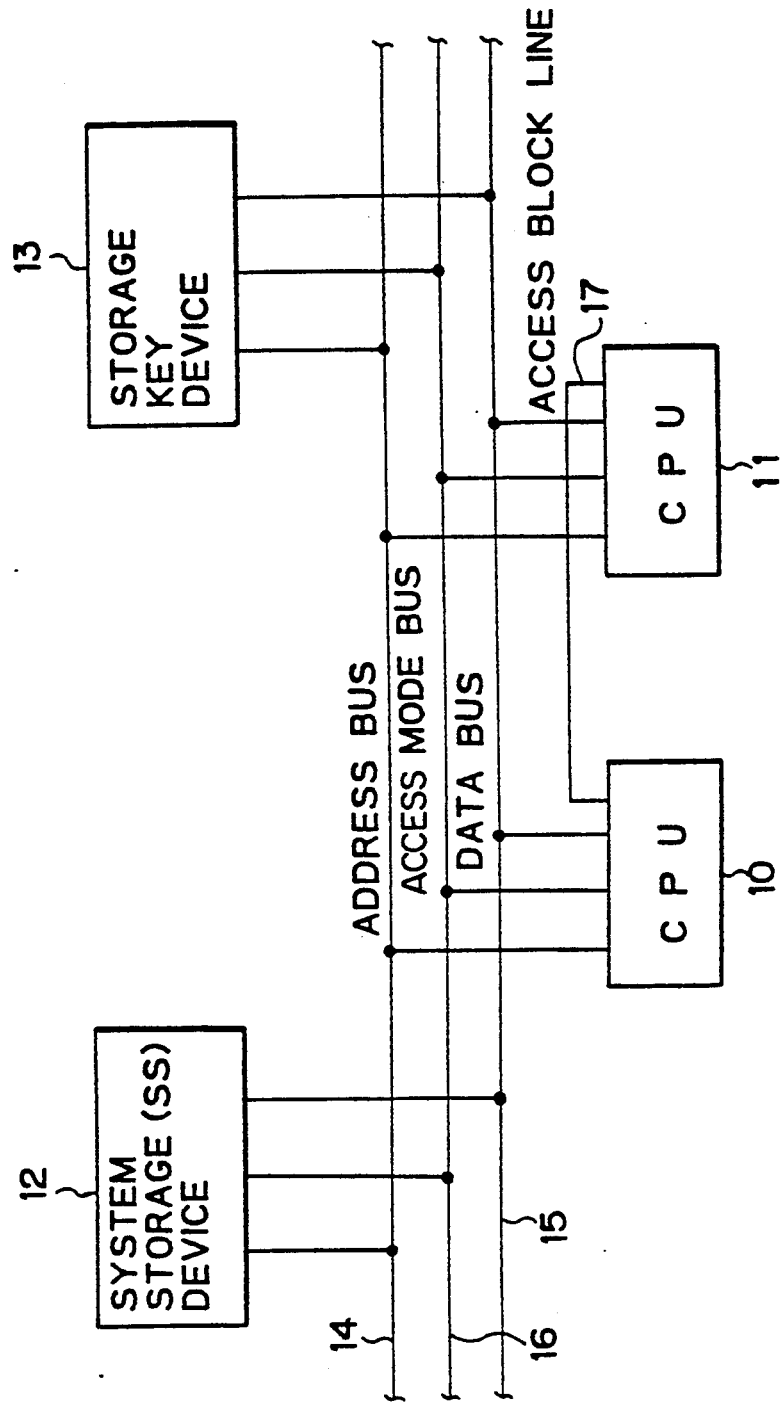
FIG. 1 is a block diagram showing a general configuration of an information processor.

FIG. 1 is a view showing a general configuration of an information processor. In FIG. 1, reference numerals 10, 11 denote CPUs, 12 a system storage (viz., S. S.) device, 13 a storage key device, 14 an address bus, 15 a data bus, 16 an access mode bus and 17 an access block signal line, respectively.

The CPUs 10 and 11 execute many kinds of processing according to programs stored in a system storage device 12.

The system storage device 12 stores multifarious data necessary for each processing other than a program that activates CPUs 10 and 11. The system storage device 12 is devised to be accessed by, for example, thirty-two bits of an address and a page address is specified by a high order of twenty-one bits and an address within a page is specified by a low order of eleven bits.

A storage key device 13 stores a state such that a CPU 10 or 11 or an input/output device (not shown) performs an access to the system storage device 12, and possesses a storage capacity corresponding to a page number of the system storage device 12, viz., an address space of 21 bits. The information stored in the storage key device 13 includes a reference bit (R bit) that shows whether or not the proper page is referred to and a change bit (C bit) that shows whether or not it is changed. The information is used for processing a virtual address.

The address bus 14 designates a bus that transmits an address for specifying an access location of a system storage device 12 or a storage key device 13.

A data bus 15 is a bus that transmits data for writing to the system storage device 12 or the storage key device 13 or data read therefrom.

An access mode bus 16 designates a bus that specifies a kind of access (hereinafter, referred to as an access mode) with regard to a system storage device 12 or a storage key device 13. Modes such as an SS read, an SS write, a storage key read, a storage key write or the like are defined.

Figure 2:
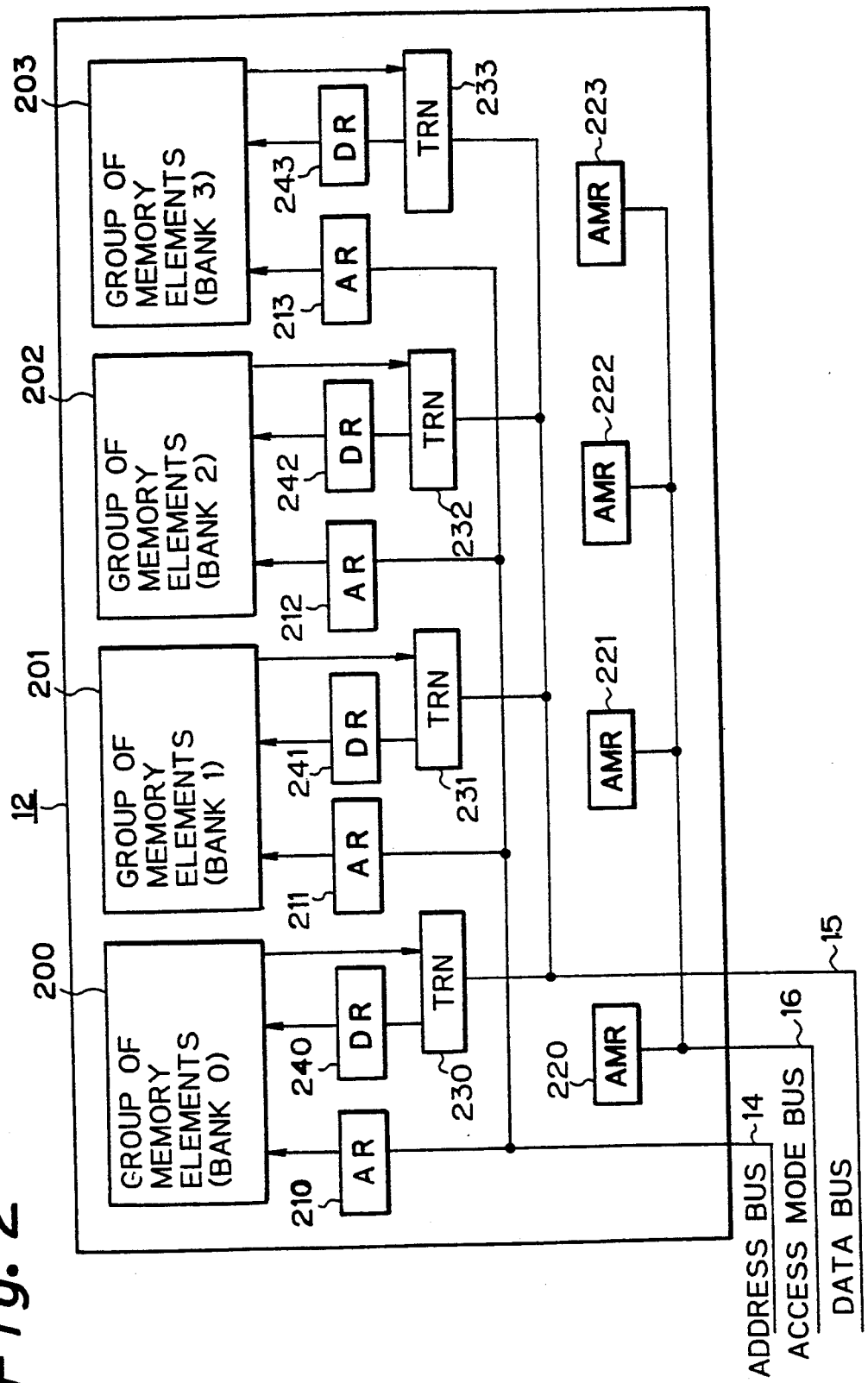
FIG. 2 is a block diagram showing a configuration of a system storage device in FIG. 6.

FIG. 2 is a block diagram showing a detailed configuration of the above-noted system storage device 12. In FIG. 2, reference numerals 200 to 203 denote each group of memory elements forming a respective bank 0 to bank 3.

Reference numerals 210 to 213 each denote an address register AR for holding an address corresponding to each bank 0 to 3. Each of the address registers 210 to 213 temporarily stores an address data from an address bus 14 to deliver the data to a group of memory elements 200 to 203.

Reference numerals 220 to 223 each denote an access mode register AMR for holding an access mode to each bank 0 to 3. In response to the content sent to these access mode registers 220 to 223, the direction for flowing data of transceivers 230 to 233 are determined and the other control signals are produced.

Reference numerals 230 to 233 each denote a transceiver TRN that switches the direction of write flow for data to each bank 0 to 3 and read data from each bank 0 to 3. The direction of data corresponds to access mode data sent to the above-noted access mode registers 220 to 223. That is, at a time of data write, the direction of data is controlled such that data flows from a data bus 15 to data registers 240 to 243, and at a time of data read, it is controlled such that data flows from groups of memory elements 220 to 203 to a data bus 15.

Reference numerals 240 to 243 each denote a data register DR for holding write data corresponding to each bank 0 to 3. Each of the data registers 240 to 243 temporarily stores write data transmitted from a data bus 15 via respective transceivers 230 to 233 to deliver it to the respective groups of memory elements 200 to 203.

In the case of a bank 0, the data write to the above-noted system storage device 12 is executed as follows.

First, a write address is sent to an address register 210 via an address bus 14 and simultaneously therewith, an access mode (SS write) signal is sent to an access mode register 220 via an access mode bus 16.

In the next cycle, write data is sent to a data register 240 via a data bus 15 and a transceiver 230. Thereby, a data write to a group of memory elements 200 is carried out.

In the case of a bank 0, the data read from the above-noted system storage device 12 is carried out as follows.

First, a read address is set to an address register 210 via an address bus 14 and simultaneously therewith, an access mode (SS read) signal is sent to an access mode register 220 via an access mode bus 16. Then, data can be read therefrom after three cycles, and data can be read from a group of memory elements 200 to deliver it to a data bus 15 via a transceiver 230.

Figure 3:
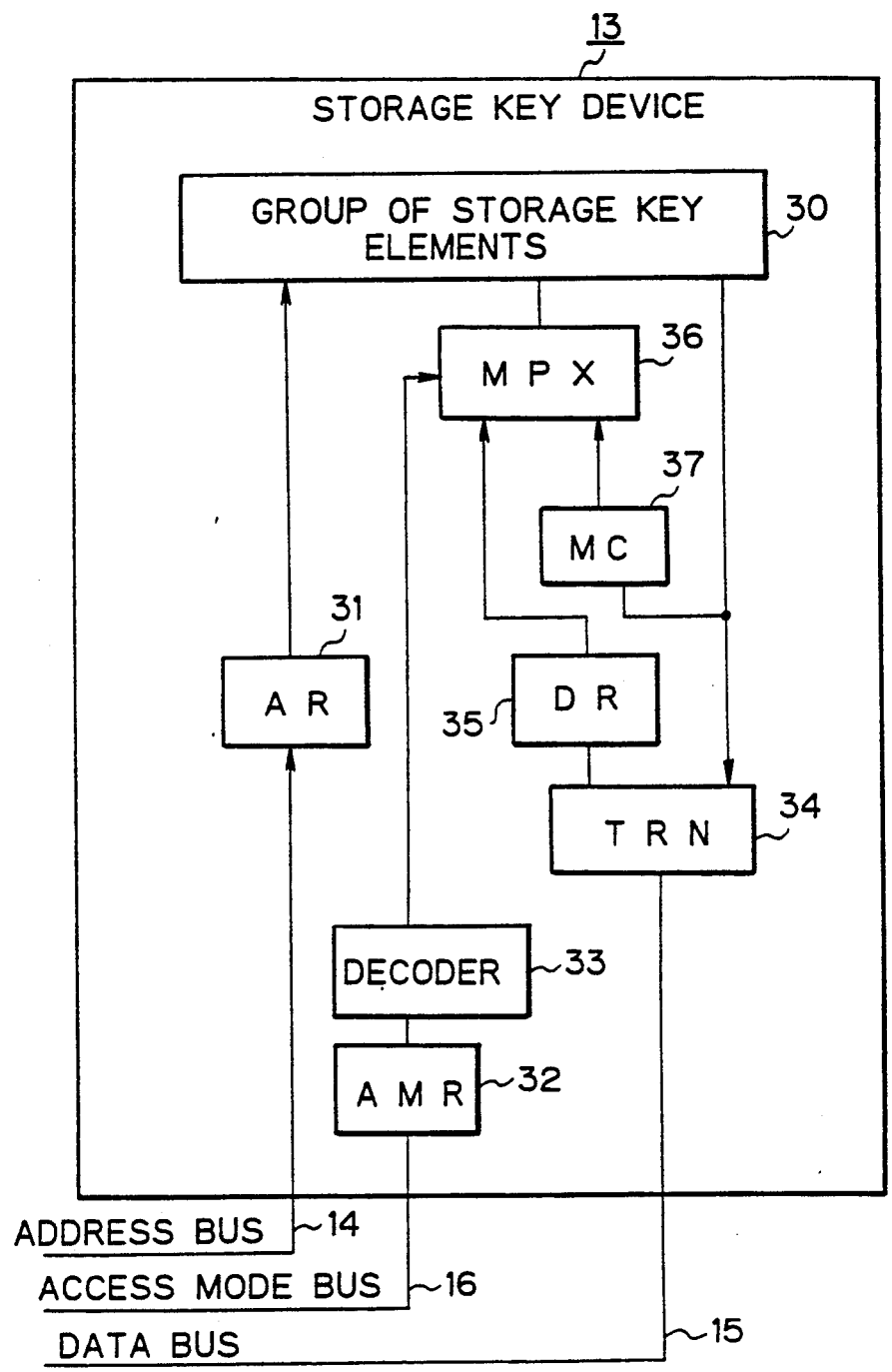
FIG. 3 is a block diagram showing a configuration of a prior art storage key device.

FIG. 3 is a detailed block diagram showing the configuration of the above-noted storage key device 13. In FIG. 3, 30 denotes a group of storage key elements. As described above, a reference bit, a change bit or the like are devised to be written in a group of storage key elements 30.

Reference numeral 31 denotes an address register AR for holding an address to a group of storage key elements 30. The address register 31 temporarily stores address data from an address bus 14 to deliver it to a group of storage key elements 30.

Reference numeral 32 denotes an access mode register AMR for holding an access mode signal to a group of storage key elements. The content sent to the access mode register 32 is delivered to a decoder 33.

Decoder 33 decodes the content sent to the access mode register 32, to produce each kind of control signal. The flow direction of data of the transceiver 34 is determined by one of the signals produced by the decoder 33.

Reference numeral 34 denotes a transceiver TRN for switching between write data to a group of storage key elements 30 and read data from a group of storage key elements 30. That is, in the case of writing data, the transceiver is controlled such that data flows from a data bus 15 to a data register 35, whereas in the case of reading data, it is controlled such that data flows from a group of storage key elements to a data bus 15.

Reference numeral 35 denotes a data register DR for holding write data to a group of storage key elements 30. The data register 35 temporarily stores write data transmitted from a data bus 15 via a transceiver 34 to deliver it to a group of storage key elements 30.

Reference numeral 36 denotes a multiplexer MPX for determining whether the data from a data bus 15 is used or the data from a modify circuit 37 is used, as write data to a group of storage key elements 30.

Reference numeral 37 denotes a modify circuit MC for modifying data read from a group of storage key elements 30 according to an access mode to deliver it to the MPX 36.

FIG. 11 is a view showing an example of an access mode. In this case, an access mode denotes a code showing an access classification and is formed by two bits (M0, M1), and four modes are defined.

Figure 4:
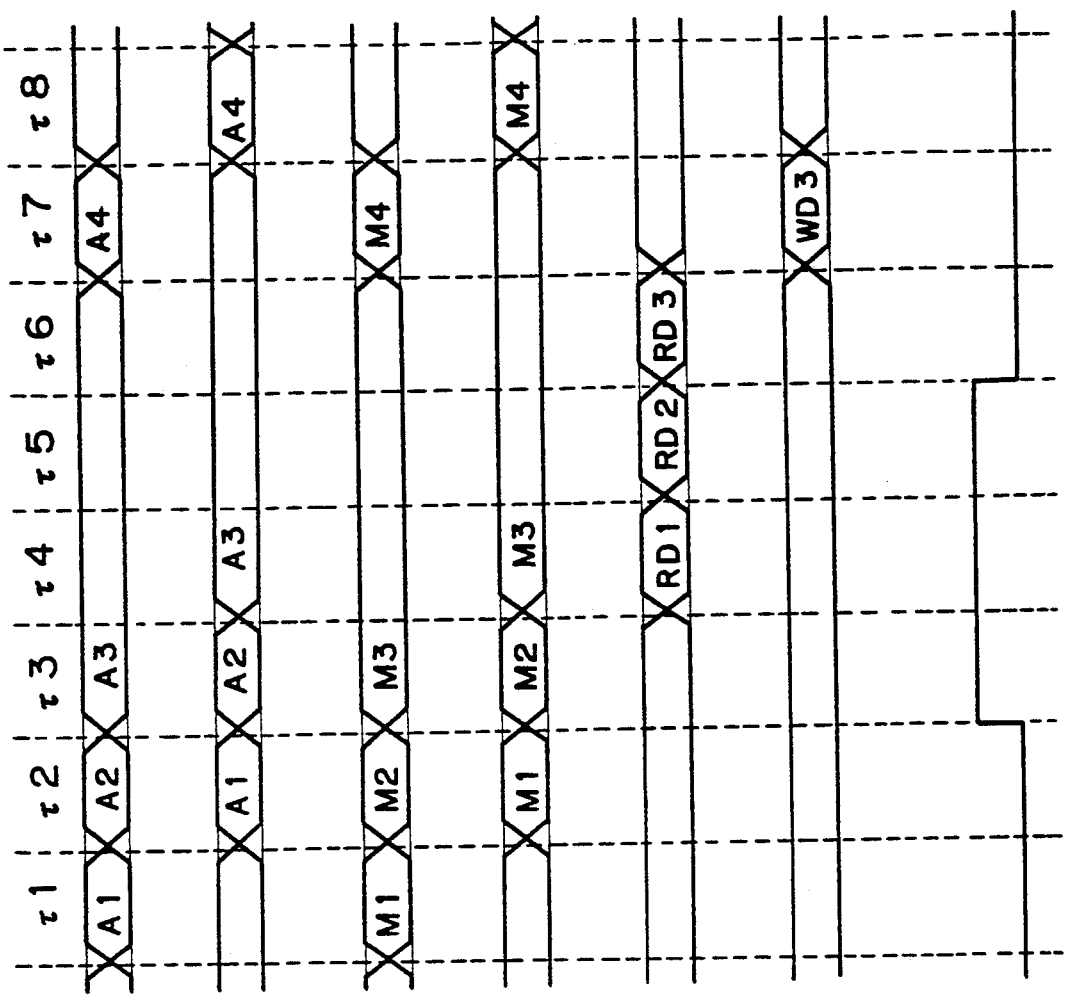
FIGS. 4 (a) to 4)g) are timing charts showing an operation of a prior art access system.

In such a configuration, with reference to a timing chart in FIG. 4, the operation of the prior art storage key device 13 and then the access operation, is described.

An access of the storage key comprises "an implicit access" and "an explicit access".

An implicit access means that, when a CPU 10 gains access (SS read or SS write) to the system storage device 12, the content of a storage location of the storage key device 13 corresponding to a page to which the storage content is referred or updated by the access, is changed.

An explicit access means that the content of the storage key device 13 is directly read or written (storage key read or storage key write), often which is more than an access to a system storage device 12.

Here, an example of a sequential operation such as "SS read"→"SS read"→"storage key write" is being carried out, will be described.

First, at a time of $\tau 1$ an SS read address A1 is transmitted to an address bus 14 (see FIG. 4(a)) and at a time of $\tau 2$ it is sent to an address register 31 (see FIG. 4(b)). At a time of $\tau 1$ an SS read access mode M1 is transmitted to an access mode bus 16 (see FIG. 4(C)) and at a time of $\tau 2$ it is sent to an access mode register 32 (See FIG. 4(d)).

Thereby, at the same time that an access to the system storage device 12 is started, an implicit access is performed at the storage key device 13. That is, a storage key corresponding to an address A1 sent to the address register 31 is read from a group of storage key elements 30 and it is modified in a modify circuit 37 in response to access mode data sent to an access mode register 32, and then delivered to a multiplexer 36. In this case, the multiplexer 36 is controlled to select the output of the modify circuit 37 by an access mode data sent to the access mode register 32. Therefore, a storage key modified in the modify circuit 37 is rewritten in the same address as a group of storage key elements 30.

Then, a modify operation in the modify circuit 37 is carried out as shown in FIG. 10. In FIG. 10, "OR" denotes a reference bit before an access, "OC" a change bit before an access, and "OP" a parity bit before an access. Further, "NR" denotes a reference bit after an access, "NC" a change bit after an access, and "NP" a parity bit after an access.

In the case of an SS access (read/write or the like) in the CPU 10 and 11, such an implicit access operation never fails to be performed in a next cycle of an address delivery. That is, with regard to an SS read access, an address delivery is performed at a time of $\tau 1$, an implicit access of the storage key is carried out at a time of $\tau 2$. With regard to an SS read access at a time of $\tau 2$, an implicit access is performed at a time of $\tau 3$.

On the other hand, an address delivered at a time of $\tau 1$ is input to a system storage device 12 and read data corresponding to the address is transferred to a data bus 15 at a time of $\tau 4$ (See FIG. 4(e)). An address delivered at a time of $\tau 2$ is input to a system storage device 12 and read data corresponding to the said address is transferred to a data bus 15 at a time of $\tau 5$ (See FIG. 4(e)).

At a time of $\tau 3$, an address A3 for an explicit access of the storage key (storage key write) is delivered to an address bus 14 (See FIG. 4(a)). Write data is generally delivered to a data bus 15 at a timing of the next $\tau 4$, but in this example, since at a time of $\tau 4$, a read data RD1 to an address A1 delivered at a time of $\tau 1$ is output, and at a time of $\tau 5$, a read data RD2 to an SS address A2 delivered at a time of $\tau 2$ is output, a delivery of a write data WD3 to the storage key device 13 waits until a time of $\tau 6$ (See FIG. 4 (e)).

A write data WD3 delivered at a time of $\tau 6$ is sent to a data register 35 at a time of $\tau 7$ (See FIG. 4(f)), and written to the storage key device 13 at a cycle of $\tau 7$.

Therefore, an address A3 that is delivered at a time of $\tau 3$ and sent to the address register 31 at a time of $\tau 4$ must also be held until a time of $\tau 7$. For this reason, since an address register 31 is blocked and an implicit access to the storage key is impossible, an access to the system storage device 12 must also be inhibited.

In a conventional system, when such a state occurs, for example, a CPU 10 (11), starting to explicitly access the storage key, is used to deliver an access block signal 17 to the other CPU 11 (10) between a time of $\tau 3$ to a time of $\tau 5$, thereby inhibiting delivery of an access address to the system storage 12 of the other CPU 11 (10) between a time of $\tau 4$ to a time of $\tau 6$ (See FIG. 4(g)).

As described above, when an explicit write access is carried out with regard to a storage key device, since an address must be held until a write operation of write data to a predetermined address of the storage key device has been completed, it is disadvantageous that a monitoring of the address cannot be carried out in the meantime and the delivery of a new address is inhibited. Further, when a prior read access is created and a delivery of write data is suspended, an access of another CPU must be inhibited and even if there is no suspension of the delivery of write data, since an access operation is inhibited for a specified time and since it is necessary to have a CPU that requires access to a system storage device, performance of the system deteriorates.

Figure 5:
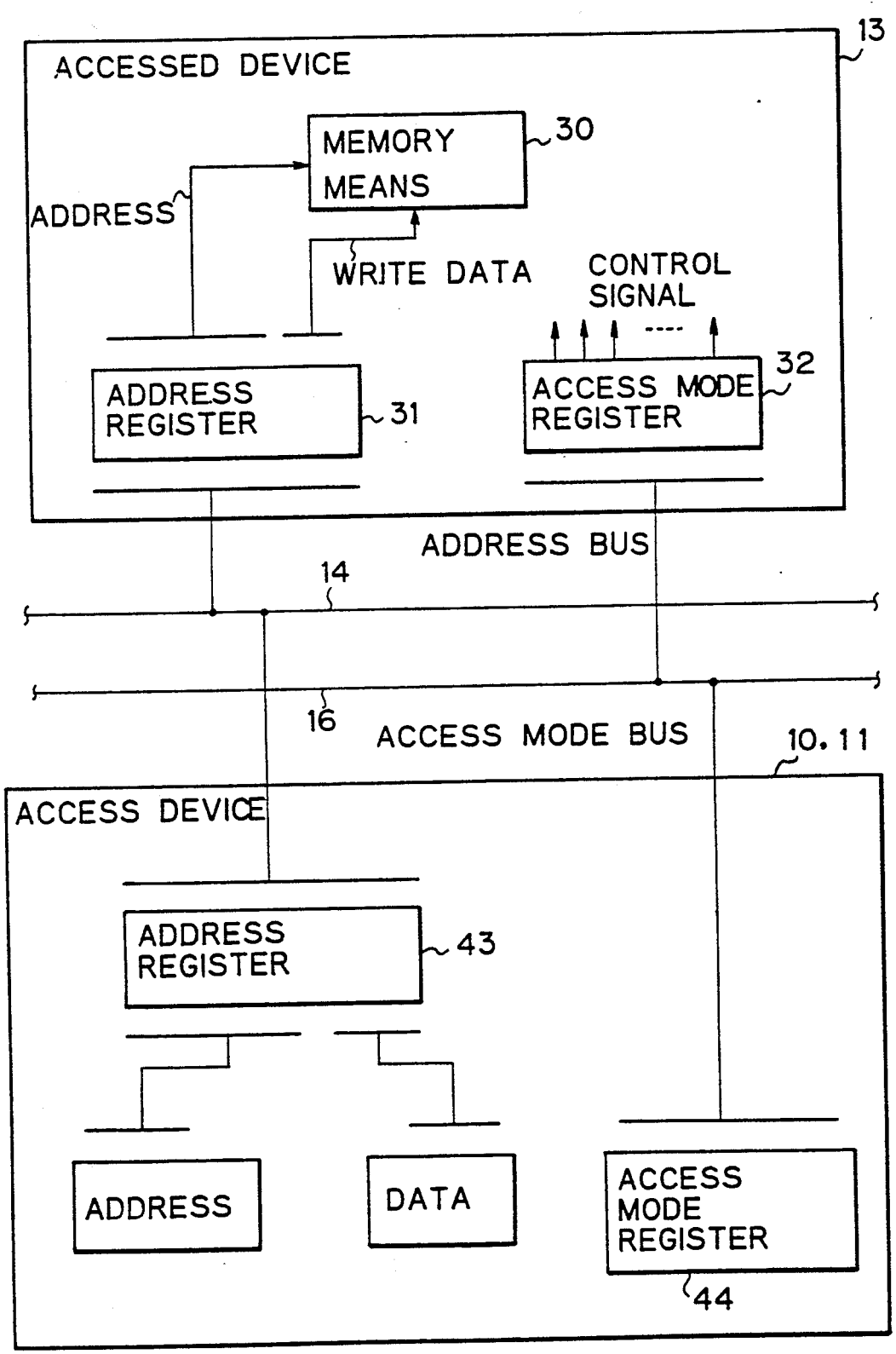
FIG. 5 is a view showing an outline of an embodiment of the present invention.

FIG. 5 denotes a view showing an outlined operation of the present invention. That is, an access processing in an information processor is formed such that, the information processor includes: an access device (10,11) for generating an access request signal; an accessed device (13) provided with a memory means (30) which is accessed by the access device (10, 11); and an address bus (14) connected to the access device and the accessed device, wherein the access processing system is processed such that, if an access request is produced, when the access request signal does not require use of all the bits in the address bus (14), an unused bit in the address bus (14) is loaded with write data and delivered to the accessed device (13), and when an access request signal from the access device (10, 11) is received by the accessed device (13) the access request signal does not use all the bits of the address bus (14), the accessed device (13) gains access to a memory means (30) of the accessed device (13), one part of the address bus (14) regarded as an address and the other part thereof regard as write data.

According to an access processing system of the present invention, when an access device 10, 11 accesses a storage means 30 of the accessed device 13, in the case of an access in a mode that does not use all the bits of the address bus 14, an unused bit is loaded with write data, thereby delivering an address and data simultaneously and separating them at the side of the addressed device 13 to perform an access to the memory means 30.

Therefore, since a data bus is not used in a conventional access, data is not competing therewith on a data bus, and since a suspension of the delivery of a write data does not occur, the buses can be utilized more efficiently than ever.

Figure 6:
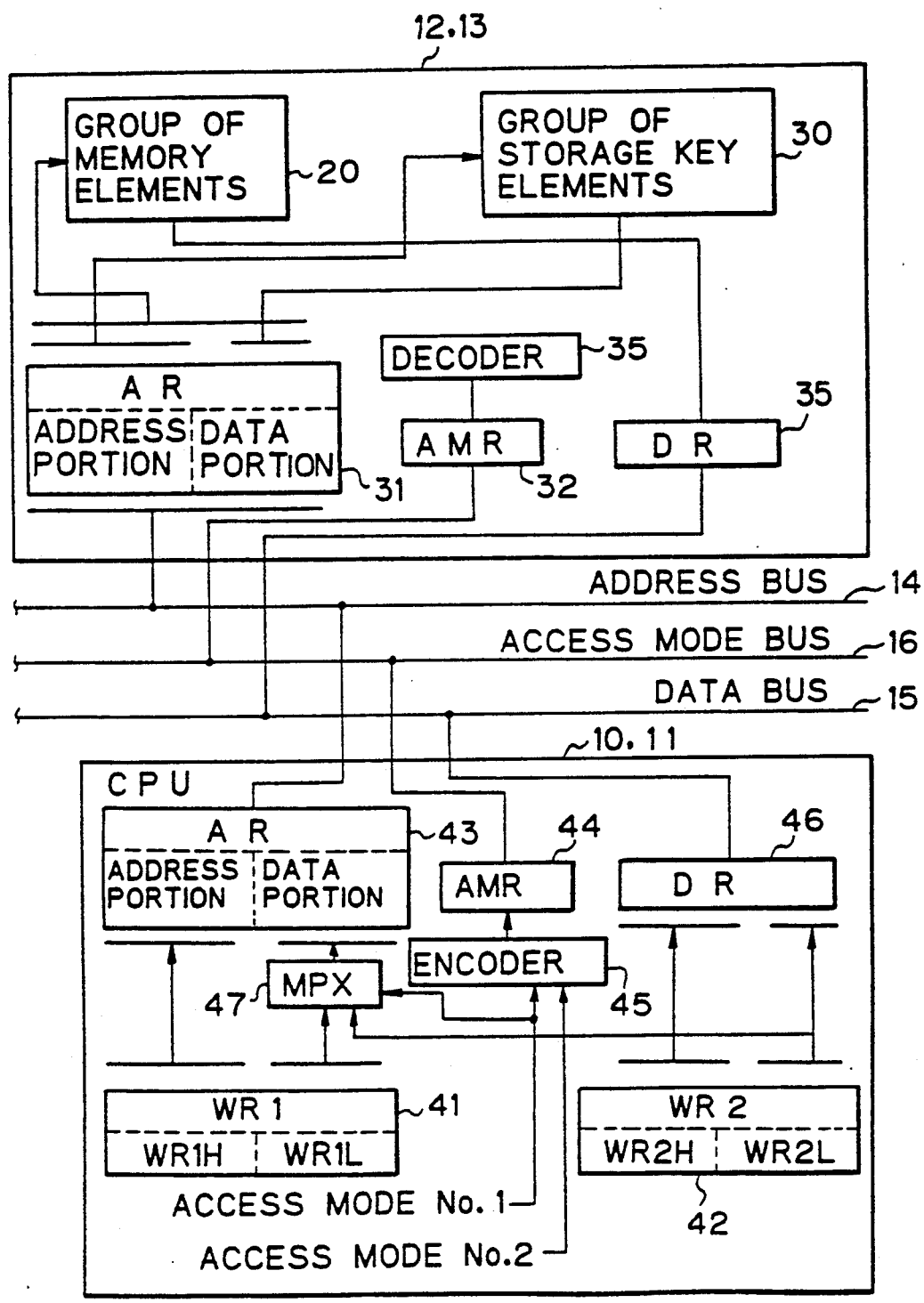
FIG. 6 is a block diagram showing a configuration of an embodiment in accordance with the present invention.

FIG. 6 is a block diagram showing the configuration of an embodiment of a data processor to which the access system of the present invention is applied.

In FIG. 6, reference numerals 10, 11 denote a CPU (hereinafter, represented by CPU 10), 12 and 13 are devices to be accessed, or accessed devices, in which a device on the side accessed by the CPU 10, viz., a system storage unit 12 and a storage key unit 13 are denoted en bloc. Also, 14 denotes an address bus, 15, a data bus, and 16 an access mode bus and since these elements are the same as already described, their descriptions will be omitted.

Reference numeral 41 denotes a work register WR 1 in the CPU 10 to which an access address is set. A high order part WR1H of the work register 41 supplies bits to a corresponding bit part in a high order portion of an address register 43 and a low order part WR1L supplies bits to a multiplexer 47.

Reference numeral 42 denotes a work register WR2 in the CPU 10, to which write data is sent. A high order part WR2H of the work register 42 supplies bits to a corresponding bit part in a high order portion of a data register 46 and low order part WR2L supplies bits to a corresponding bit part in a low order part of the data register 46 and to a multiplexer 47.

Reference numeral 43 denotes an address register AR in the CPU 10. A high order part of the address register 43 is an address portion where corresponding data in a high order part of the work register 41 is sent, whereas a low order part of the address register 43 is a data portion where a low order part of the work register 41 selected by a multiplexer 47 (a low order part of the address) or a low order part of the work register 42 (a low order part of the data) is sent. The contents of the address register 43 are delivered to an address bus 14.

Reference numeral 44 denotes an access mode register AMR in the CPU 10, to which a coded access mode bit is sent, as shown in FIG. 11. The contents of the access mode register 44 is delivered to an access mode bus.

Reference numeral 45 denotes an encoder in which either an access mode No. 1 signal or No. 2 signal is coded in order to send the coded signal to the access mode register 44, where the access mode No. 1 is a signal sequence in an access to a system storage device 12 and the access mode No. 2 is a signal sequence in an access to a storage key device 13. An access mode No. 1 signal is also delivered to a multiplexer 47 and is also used as a signal which selects a low order part WR1L in a work register 41.

Reference numeral 46 denotes a data register DR by which write data stored in a work register 42 is held therein, and the content of the data register 46 is delivered to a data bus 15.

Reference numeral 47 denotes a multiplexer MPX in which either a signal of a low order part WR1L in a register 41 or a signal of a low order part WR2L in a work register 42 is selected in response to an access mode No. 1 signal and either one of the selected signals is delivered to a low order part of an address register 43.

On the other hand, both accessed devices 12 and 13 are formed as follows.

A group of memory elements 20 denote a memory element as a system storage device 12 that stores a program or data as described above.

A group of storage key elements 30 denote a memory element as a storage key device 13 that stores a storage key that includes a reference bit R, a change bit C and a parity bit P.

Reference numeral 31 denotes an address register AR in the accessed devices 12 or 13. Address data is sent to the address register 31 from an address bus 14, and in the case of the access mode No. 2, its high order part is used for an address portion and its low order part for a data portion, whereas in the case of the access mode No. 1, all are used for holding an address. The content of the address register 31 is supplied to a group of memory elements 20 or a group of storage key elements 30 in response to the access mode.

Reference numeral 32 denotes an access mode register AMR in the accessed devices 12 and 13 to which the content of an access mode bus 16 is sent. The content of the access mode register 32 is delivered to a decoder 33.

Reference numeral 33 denotes a decoder 33 that interprets the content of the access mode register 32 and generates a control signal of each portion in the whole device. Thereby, whether a control signal is accessed to a group of memory elements 20 or a group of memory key elements 30, or whether an access is a read signal or a write signal, it is determined to control each portion in the whole device.

Reference numeral 35 denotes a data register DR in the accessed device 12 or 13. Write data is sent to the data register 35 from the data bus 15. The content of the data register 35 is delivered to a group of memory elements 20.

The operation in the above configuration will be described hereinafter.

When a central processing unit CPU 10 makes an access in an access mode No. 1, the content of a work register 41 is sent to an address register 43 intact. high order portion WR1H of the work register 41 is sent to an address portion of the address register 43 and a low order portion WR1L of the work register 41 is sent to a data portion thereof via a multiplexer 47. The content of a work register 42 is sent to a data register 46 intact. The data of which an access mode No. 1 is encoded by an encoder 45 is set to an access mode register 44. The contents of these registers 43, 46 and 44 are output to a respective address bus 14, data bus 15 and access mode bus 16 to be delivered to the accessed devices 12 and 13. Then, the contents are sent to an address register 31, a data register 35 and an access mode register 32, respectively, in each accessed device 12, 13.

When the access mode data sent to the access mode register 32 is decoded by a decoder 33 to determine an access of the access mode No. 1, a processing is effected such that the content of an address register 31 is accessed to a group of memory elements 20 as an address.

On the other hand, when the CPU 10 gains access in an access mode No. 2, a high order portion WR1H of the work register 41 is sent to an address portion of the address register 43 and a low order portion WR2L of the work register 42 is sent to a data portion of the address register 43 via a multiplexer 47. The data of which signals in an access mode No. 2 are encoded by an encoder 45 are sent to an access mode register 44. The contents of the registers 43 and 44 are output to an address bus 14 and an access mode bus 16, respectively, and supplied to the accessed devices 12 and 13 and then sent to an address register 31 and an access mode register 32, respectively.

If the data sent to the access mode register 32 is decoded by the decoder 33 to be accessed by the access mode No. 2, the content of a high order part of the address register 31 is given an access to a group of storage keys 30 as a write address and the content of a low order part of the address register 31 as write data. In this case, a data register 46, data bus 14 and a data register 35 are not used.

A more detailed block diagram is provided by FIG. 3 on a storage key device 30 in the accessed devices 12 and 13.

Figure 7:
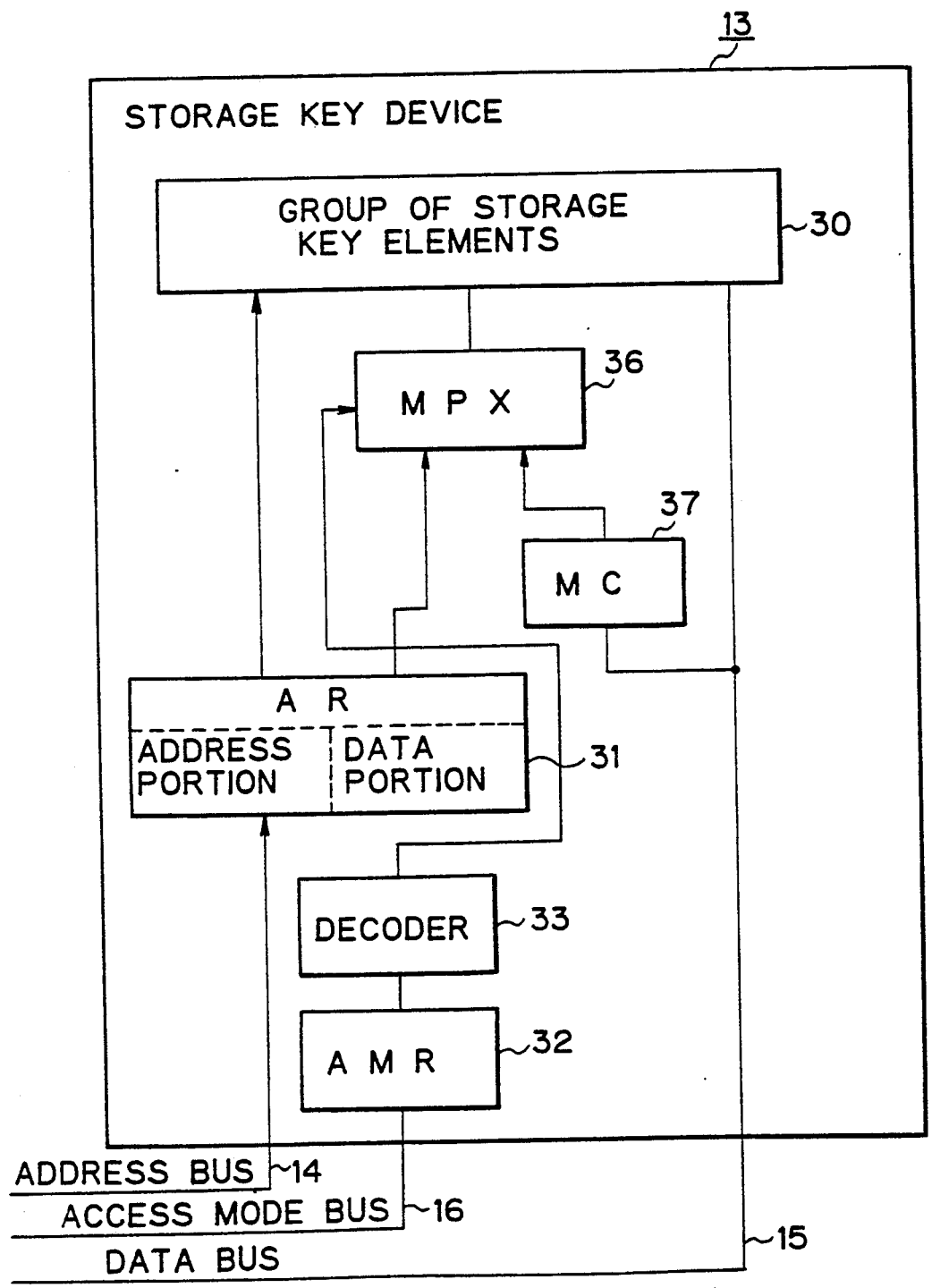
FIG. 7 is a block diagram showing a storage key device in FIG. 6.

In FIG. 7, reference numeral 30 denotes a group of storage key elements. As described above, a reference bit, a change bit or the like is written in the group of the storage key elements 30.

Reference numeral 31 denotes an address register AR for holding an address to a group of storage key elements 30. The address register 31 temporarily stores an address register from an address bus 14 in a high order part (in an address portion) and write data in a low order part (in a data portion), then delivers this data to the group of storage key elements 30.

Reference numeral 32 denotes an access mode register AMR for holding an access mode signal to a group of storage key elements 30. The content sent to the access mode register 32 is delivered to a decoder 33.

Decoder 35 received the content sent to the access mode register 32 and decodes it, to generate may kinds of control signals. One of the signals generated by the decoder 33 becomes a selective signal of a multiplexer MPX 36.

Multiplexer MPX 36 which, for write data to a group of storage key elements 30, selects whether the data of a low order part in the address register 31 could be used or whether the data from a modify circuit 37 could be used.

Modify circuit MC 37 modifies data read from a group of storage key elements 30 according to an access mode to deliver it to a multiplexer MPX 36.

Figure 8:
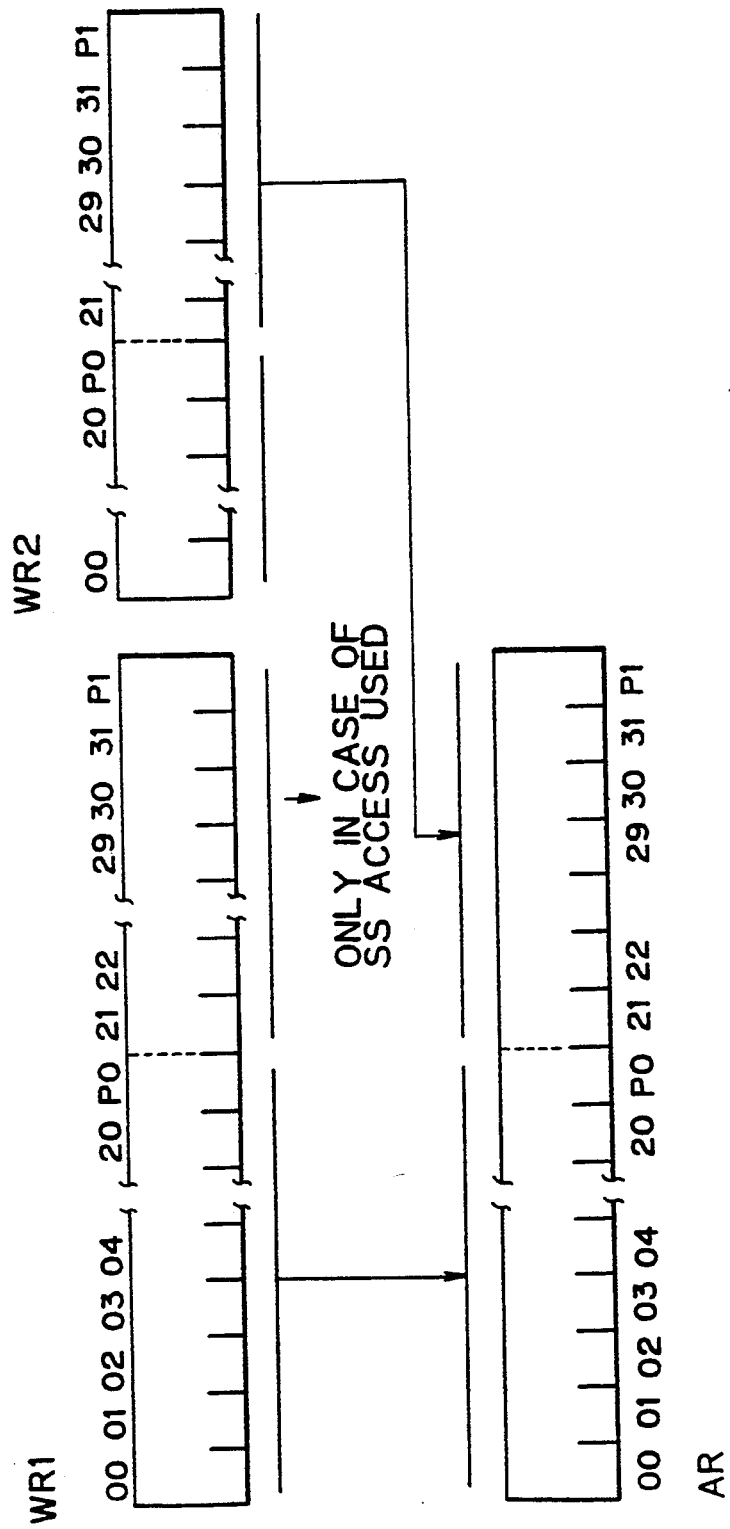
FIG. 8 is a view showing a group of data on an address bus in FIG. 6.

FIG. 8 is a view showing a detailed example of an address data on an address bus 14, when an access mode No. 2 is executed.

In FIG. 8, a high order part of a work register 41 and a low order part of a work register 42 are combined to be sent to an address register 43 and lengthened out to be sent to an address register 31. A low order part of a work register 41 is used only in the case of access to the system storage device.

That is, the content of the work register 41 means that bits 00 to 20 are a page address to the system storage device 12 and a bit $P_0$ is defined as a parity bit for these bits, and that bits 21 to 31 are addresses within a page and a bit $P_1$ is defined as a parity bit for these bits.

Since a storage key is possessed per page unit of the system storage device, an address will be adequate only if there is a page address. Accordingly, in the case of an explicit write of a storage key, bits 00 to 20 and $P_0$ in the work register 41 are set to a high order part corresponding to the address register 43, whereas bits 21 to 31 and $P_1$ of the work register 42 sent to a low order part corresponding to the address register 43.

In the storage key device 13, an address register 31 is divided into an address portion and a data portion and the operation of both parts applies correspondingly to FIG. 8.

In the above configuration, with reference to a timing chart in FIG. 9, regarding the operation of the storage key device 13 (the most common), an access operation will be described.

Herein, the case where the operation "SS read"→"SS read"→"storage key write"→"SS read" is successively executed, will be stated.

Figure 9:
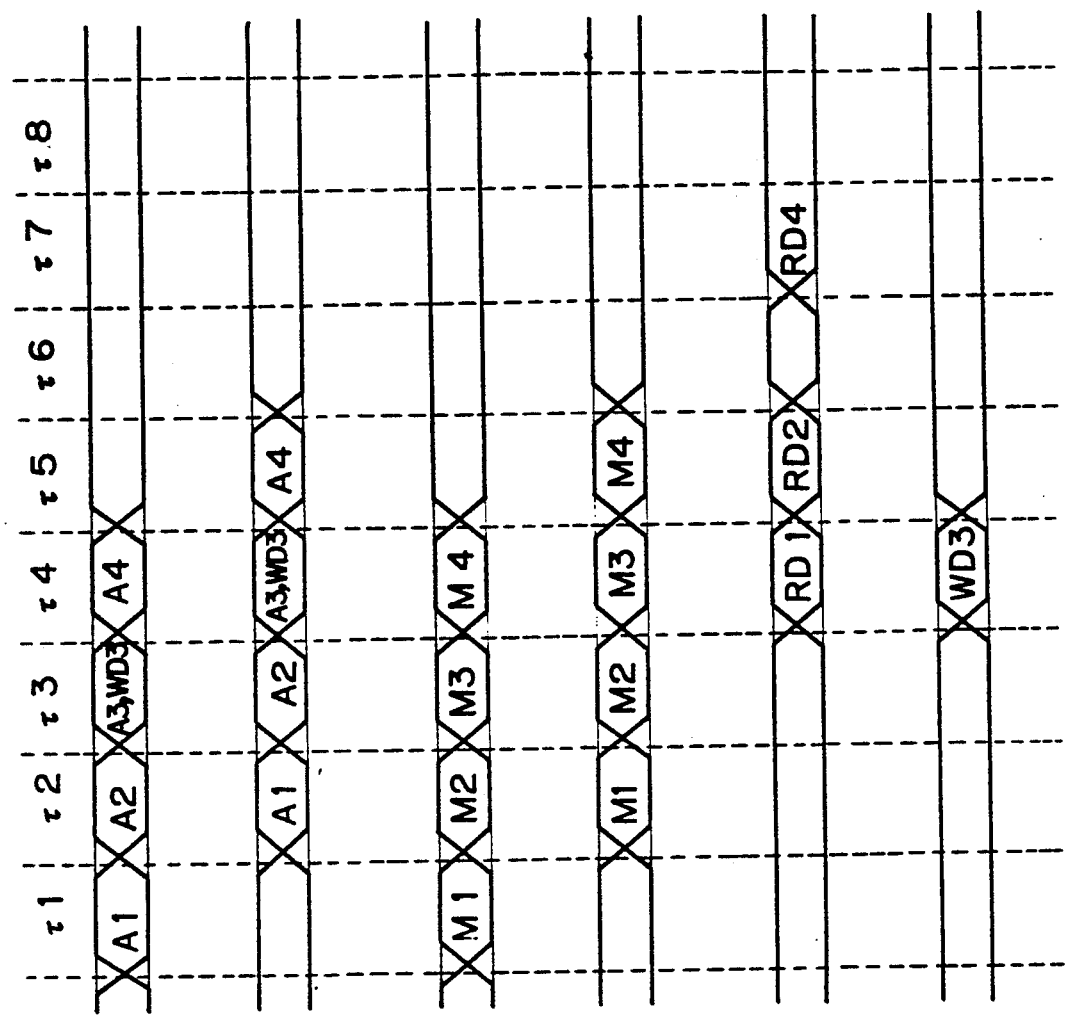
FIGS. 9(a) to 9(f) are timing charts of data on each bus and each corresponding register.

First of all, an SS (system storage) read address A1 is delivered to an address bus 14 at a time $\tau 1$ (refer to FIG. 9(a)) and sent to an address register 31 at a time $\tau 2$ (refer to FIG. 9 (b)). An SS read access mode M1 is delivered to an access mode bus 16 at a time $\tau 1$ (see FIG. 9 (c)) and sent to an access mode register 32 at a time $\tau 2$ (see FIG. 9 (d)).

Thereby, an implicit access to the storage key device 13 is carried out. That is, a storage key corresponding to an address A1 sent to an address portion in the address register 31 is read out from a group of storage key elements in response to information sent to an access mode register 32, and modified in a modify circuit 37 to deliver it to a mulitiplexer 36. The mulitiplexer 36 is controlled such that an output of the modify circuit 37 may be selected by the data sent to the access mode register 32. Therefore, an output of a storage key modified by the modify circuit 37 is rewritten in the same address of a group of storage key elements 30. In this case, a modify operation in the modify circuit 37 is the same as shown in FIG. 10. Moreover, when a storage key makes an implicit access, a data portion of the address register 31 is not used. The data portion is used as an address within a page in the case of the system storage device 12.

On the other hand, an address delivered at a time $\tau 1$ is input to the system storage device 12 and a read data corresponding to the said address is transferred to a data bus 15 at a time $\tau 4$ (see FIG. 9(e)). Similarly, an address delivered at a time $\tau 2$ is input to the system storage device 12 and a corresponding read data RD1 is transferred to a data bus 15 at a time $\tau 5$ (see FIG. 9(e)).

An address A3 for an explicit access of the storage key (storage key write) is delivered to an address bus 14 at a time $\tau 3$ (see FIG. 9(a)). In the prior art, write data delivered to a data bus 15 at a timing of $\tau 4$ generally is delayed by $\tau 2$, after all, it is delivered at a time $\tau 6$, whereas in an embodiment of the present invention, it is not necessary for an explicit write of a storage key to deliver write data to a data bus 15. In the place of it, when an address is delivered, an address of the storage key A3 is delivered to a high order twenty-one bits and explicit data WD3 is delivered as two bits and a parity bit among eleven bits of a low order.

Therefore with regard to an address A3 delivered at a time $\tau 3$ and sent to the address register 31 at a time $\tau 4$, it is not necessary to hold the value of an address A3 up to a time $\tau 7$, because, an explicit write is finished by a cycle of a time $\tau 4$. Therefore, distinct from the results in the prior art, an address register 31 is not locked and is able to make an implicit access of the storage key, such that access to the system storage device 12 is not inhibited.

Therefore, one CPU 10 (or 11) that has started to make an explicit access of the storage key, outputs an access block signal 17 to another CPU 11 (or 10) between a time $\tau 3$ and a time $\tau 5$, and as a result, it is not necessary for an access address to the system storage device 12 of another CPU 11 (or 10) to inhibit delivery between a time τ4 to a time τ6. Therefore, an address A4 of the next access can be output from a time τ4 to prevent deterioration of performance.

We claim:

1. An access processing system in an information processor, comprising:
   an accessed device provided with a memory means;
   an access deice for generating an access request signal for accessing said memory means according to a first access type; and
   an address bus and an access mode bus each connected to said access device and said accessed device, said access device generating the access request signal for an access to said memory means according to the first access type when less than all bit of said address bus are used for the access, said access device loading said access mode bus with mode data indicating the first access type and loading bits of said address bus, unused as address bits, with data including write data to be transferred to said accessed device, and when the mode data received by said accessed device from said access device through said access mode bus indicates the first access type, said accessed device reads predetermined bits of said address bus as address data and other bits of said address bus as the write data to access said memory means of said accessed device.

2. The access processing system in an information processor according to claim 1, wherein said memory mans is a storage key device.

3. The access processing system in an information processor according to claim 1, wherein said access device comprises:
   first control means for controlling a flow of said address data and said write data from said access device to said accessed device, said first control means comprising:
      a first work register storing access address data,
      a second work register storing said write data,
      a first address register, and
      an access mode register,
      a high order part of said first address register being an address portion storing corresponding access address data from a high order part of said first work register, a low order part of said first address register being one of an address portion, storing corresponding access address data from a low order part of said first work register according to a second access type, and a data portion, storing corresponding write data from a low order part of said second work register according to said first access type, contents of said first address register being delivered to said address bus, contents of said access mode register being delivered to said access mode bus when the access request signal is generated according to the first access type.

4. The access processing system according to claim 1 wherein:
   said accessed device comprises:
      a group of storage key elements, and
      a decoder, operatively connected to said group of storage key elements and said access mode bus, generating a plurality of control signals in dependence upon an access mode signal; and
   said access device comprises:
      an access mode register, operatively connected to said access mode bus, storing the access mode signal for access to said group of storage key elements and outputting the access mode signal through said access mode bus to said decoder, and
      a first address register temporarily storing said address data in a high order part as an address portion and said write data in a low order part as a data portion, and outputting the address portion and the data portion to said group of storage key elements through said address bus.

5. A data processing apparatus having a plurality of units, comprising:
   an accessed device including a memory;
   an access device for generating an access request signal for accessing said memory of said accessed device, said access request signal including a code indicating an access type, said access device outputting address data, write data and said code indicating an access type; and
   a common bus, operatively connected to said plurality of units including said access and accessed device, including at least an address bus, a data bus and a type bus, the type bus delivering the code indicating the access type from said access device to said accessed device, said address bus carrying both said address data and said write data output from said access device to said accessed device if said address data requires less than all bits of said address bus, and said data bus carrying said write data output from said access device to said accessed device if said address data requires all said bits of said address bus.

6. The data processing apparatus according to claim 5, wherein, when said access device accesses said memory using a first portion of less than all bits of the address bus, the code indicating the access type is outputted simultaneously with the address data, and said write data is delivered from said access device to said accessed device using a second portion of unused bits of the address bus not included in the first portion.

7. The data processing apparatus according to claim 6, wherein, when said accessed device receives the code indicating the access type, the second portion of the address bus is regarded as write data to be separated from the address and stored in an area of said memory indicated by the address data.

8. An information processor, comprising:
   a memory unit, storing data, accessible according to an access request of at least a first type;
   an address bus having a plurality of bits and connected to said memory unit;
   an access device, connected to said address bus, and outputting address data through a number of said plurality of bits of said address bus to said memory unit and simultaneously outputting write data through ones of said plurality of bits distinct from said number of said plurality of bits to said memory unit when the access request is of the first type.

* * * * *

UNITED STATES PATENT AND TRADEMARK OFFICE
CERTIFICATE OF CORRECTION

PATENT NO. : 5,327,539
DATED : July 5, 1994
INVENTOR(S) : Kiyoshi SUDO et al.

It is certified that error appears in the above-indentified patent and that said Letters Patent is hereby corrected as shown below:

In the Drawings

Sheet 1, insert --signal-- between "block" and "line";

Sheet 6, delete "35" at DECODER rectangle and insert --33-- at DECODER rectangle.

Column 1, line 60, after "all" insert --the--.

Column 2, line 3, change "said" to --the--;

line 20, delete "said";

line 27, after "connected," delete paragraph break;

line 30, after "necessitate" insert --the use of--;

line 37, delete ",";

line 52, change ")g)" to --(g)--.

Column 3, line 62, delete "the";

line 64, after "of" insert --flow for--; after "write" delete "flow for".

Column 5, line 3, after "mode" insert --,--;

line 23, after "," insert --which is more--; after "often" delete "which is more";

line 26, delete "is".

Column 6, line 62, change "regard" to --regarded--.

UNITED STATES PATENT AND TRADEMARK OFFICE
CERTIFICATE OF CORRECTION

PATENT NO. : 5,327,539
DATED : July 5, 1994
INVENTOR(S) : Kiyoshi SUDO et al.

It is certified that error appears in the above-indentified patent and that said Letters Patent is hereby corrected as shown below:

Column 7, line 17, after "15" delete ",";
          line 48, after "bus" insert --16--;
Column 8, line 41, after "." insert --A--;
Column 9, line 32, change "35" to --33--;

line 45, delete "an"
          line 50, delete "out".
Column 12, line 16, change "A" to --The--.

Signed and Sealed this

Sixth Day of December, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,327,539
DATED : July 5, 1994
INVENTOR(S) : Kiyoshi Sudo, et al

It is certified that error appears in the above-identified that said Letters Patent is hereby corrected as shown below:

Column 9, line 32, "received" should read-- receives--

Signed and Sealed this

Third Day of January, 1995

BRUCE LEHMAN

*Attest:*

*Attesting Officer*          *Commissioner of Patents and Trademarks*